(12) United States Patent
Cazcarra Pallaruelo

(10) Patent No.: US 9,115,824 B2
(45) Date of Patent: Aug. 25, 2015

(54) FLUID CONTROL VALVE FOR HIGH PRESSURE SURGES

(71) Applicant: BADAIN, S.L., Arascues. Huesca (ES)

(72) Inventor: Sebastian Cazcarra Pallaruelo, Huesca (ES)

(73) Assignee: BADAIN, S.L., Arascues. Huesca (ES)

( * ) Notice: Subject to any disclaimer, the term of this patent is extended or adjusted under 35 U.S.C. 154(b) by 109 days.

(21) Appl. No.: 14/075,659

(22) Filed: Nov. 8, 2013

(65) Prior Publication Data

US 2015/0129786 A1    May 14, 2015

(51) Int. Cl.
*F16K 47/08* (2006.01)
*F16K 3/24* (2006.01)

(52) U.S. Cl.
CPC .. *F16K 47/08* (2013.01); *F16K 3/24* (2013.01)

(58) Field of Classification Search
CPC ............ F16K 47/08; F16K 47/12; F16K 3/24
USPC ............... 138/42–43; 251/118, 126, 127, 205
See application file for complete search history.

(56) References Cited

U.S. PATENT DOCUMENTS

| | | | | |
|---|---|---|---|---|
| 1,473,052 A * | 11/1923 | Shaw | ............................ | 251/126 |
| 3,514,074 A * | 5/1970 | Self | ................................. | 138/42 |
| 3,802,537 A * | 4/1974 | White | ............................ | 138/42 |
| 3,977,435 A * | 8/1976 | Bates | ............................ | 251/127 |
| 4,407,327 A * | 10/1983 | Hanson et al. | ................. | 251/126 |
| 4,567,915 A * | 2/1986 | Bates et al. | ..................... | 138/42 |
| 6,701,957 B2 * | 3/2004 | McCarty et al. | ................ | 138/42 |
| 2003/0188787 A1 * | 10/2003 | Steinke | .................... | 137/625.33 |
| 2010/0300542 A1 * | 12/2010 | Haines et al. | ................. | 137/597 |

* cited by examiner

*Primary Examiner* — John Bastianelli
(74) *Attorney, Agent, or Firm* — Brooks Kushman P.C.

(57) ABSTRACT

A fluid control valve for high pressure surges, that has a controlled pressure drop box inside, arranged on a block seat and through whose core a cylindrical plug can be moved. The box is formed by a number of disks grooved on both sides, fluid flows through the grooves. The grooves are arranged in a spiral, curved clockwise or counterclockwise and crossways to the grooves of the adjacent disks, forming a number of chambers at the intersections between the contact faces of two side-by-side disks. A dynamic mixture of the incoming fluid veins through each groove is produced in each of the chambers, with the ensuing creation of local turbulence and loss in kinetic energy as heat prior to evacuation through the protruding course of the outlet grooves. The successive chambers in the course of the grooves are arranged in tiered annular spaces of gradual and controlled pressure loss.

2 Claims, 4 Drawing Sheets

FLUID CONTROL VALVE FOR HIGH PRESSURE SURGES

TECHNICAL FIELD

The purpose of the invention patent application herein is to register a control valve for high pressure surges that incorporates significant innovations and advantages over existing control valves used for a similar purpose.

More specifically, the newly invented valve has a box or disk pack having a grooved surface with grooves arranged in a spiral, such that the grooves of one side of a disk are oriented in the opposite direction to the grooves of the adjacent face of the adjoining disk, thereby forming a tiered system of setting chambers for equalizing the flow of fluid there through, regulating the flow of said fluid according to a gradual pressure drop, without generating noise, vibration or wear on the material.

The scope of application of the invention lies within the industrial sector dedicated to the manufacture and/or installation of valves in general.

BACKGROUND

It is known that in existing control valves when the pressure drop in the valve is high, noise, vibration and rapid wear of the valve parts are produced that choke or regulate the flow of fluid, namely, the plug or stopper and the seat ring, or in the cylinder, in those valves that produce reduced pressure via a perforated cylinder or box.

With reference to the current state of the art, the existence of different types of control or regulating valves should be noted which, either do not solve the problem, or they do so in a complicated and costly manner, as described below There are multi-stage valves that produce pressure surges with the corresponding recovery thereof, in whose cores sonic conditions or cavitation which cause noise, vibration, etc. are present.

Other valves use labyrinthine paths which, in order to be effective, require large pathways resulting in obtaining oversized valves.

SUMMARY

In respect of the fluid control valve for high pressure surges object of this registration, the main objective is to overcome the drawbacks set forth hereinabove, which exist in the current prior art, and to that end, this newly invented valve has been designed and that is going to be described hereinafter, by which the pressure loss inside the valve occurs in a gradual, tiered and continuous manner is achieved, thereby eliminating the problems of noise, vibration and wear. To this end, a box or cylinder formed by overlapping disks with grooves or spiral-shaped grooves has been designed inside the valve body that divide the total flow into a number of smaller flows, of which half turn counterclockwise and half turn clockwise.

These flows intersect and collide in such disks, as they follow different directions, losing their kinetic energy (speed) while generating small localized turbulence and heat, according to the principles of fluid mechanics.

Maximum efficiency is achieved by means of disks, which contrary to labyrinth type disks, they are grooved on both sides, have no blind areas and therefore increase the valve's capacity to equal nominal diameter.

In fact, the new invention essentially consists of a stack of disks arranged on a seat and compressed by the top cover and disk holder. Said stack of disks has a cylindrical orifice in the center through which the plug is tightly moved, from a lower position which closes the flow by throttling the ring or mouth of the seat to an upper position in which the inflow through the seat mouth circulates through all the disks. Each of the disks has a number of grooves in a spiral on each of its faces. The fluid circulating through the valve passes through these grooves when the plug releases its inner contour. Each disk is stacked adjoining a complementary disc that equally has a grooved contour, but in the opposite direction. The grooves of the adjacent faces of two side-by-side disks form a number of chambers at the intersections of the grooves, depending on the number thereof and the rotation they have, these chambers being arranged in concentric rings. The flow from both fluid veins corresponding to each groove of the disk in these chambers generate a small turbulence, in which kinetic energy (speed) is essentially progressively lost. Each chamber, in turn, causes a tiered reduction in the energy flow, which added to the effect of the other chambers, performs the intended aim of reducing pressure. The chambers discharge the fluid contained in the extension of the incoming grooves into the chambers of the next annular space. The plug is fully movable from the lower mouth of the seat to the upper part, progressively uncovering the grooves of the successive stacked disks. The pressure regulation is therefore progressive and gradual, thus facilitating the operation.

For example, a preferred arrangement of the grooves and their deflection angles comprises grooves on each face of each disk, following a spiral course, there being a 90° angular difference between the inner source of the groove and the outer mouth thereof, six chambers or cells being formed along each groove.

As the disks have grooves arranged radially, they further facilitate the annulation of lateral and tangential forces, as the fluid is carried out evenly all around it. A reduction in pressure is therefore attained in several tiers without pressure recovery and therefore without the risk of reaching critical conditions (sonic, cavitation) at the core of each recovery.

From the above it is understand that the design of the grooved disk box, described thus far, solves several very different problems:

It eliminates noise and vibration problems even with high pressure surges when these break down into several smaller, non-critical tiers with no intermediate recoveries, by converting pressure energy into turbulence and heat.

It reaches twice the capacity, the same as the valve size, by using grooved disks on both sides.

It ensures an even distribution of pressure around the plug, thereby eliminating uneven wear by friction thereof, by using the section of the grooves that balance the pressure at each level of the intersections or junctions of the fluid veins.

To complete the description herein below and in order to help better understand its characteristics, accompanying the descriptive memory herein are a set of drawings in whose figures, by way of illustration and non-limiting in manner, the most significant details of the invention are represented.

DETAILED DESCRIPTION

Figure 1:
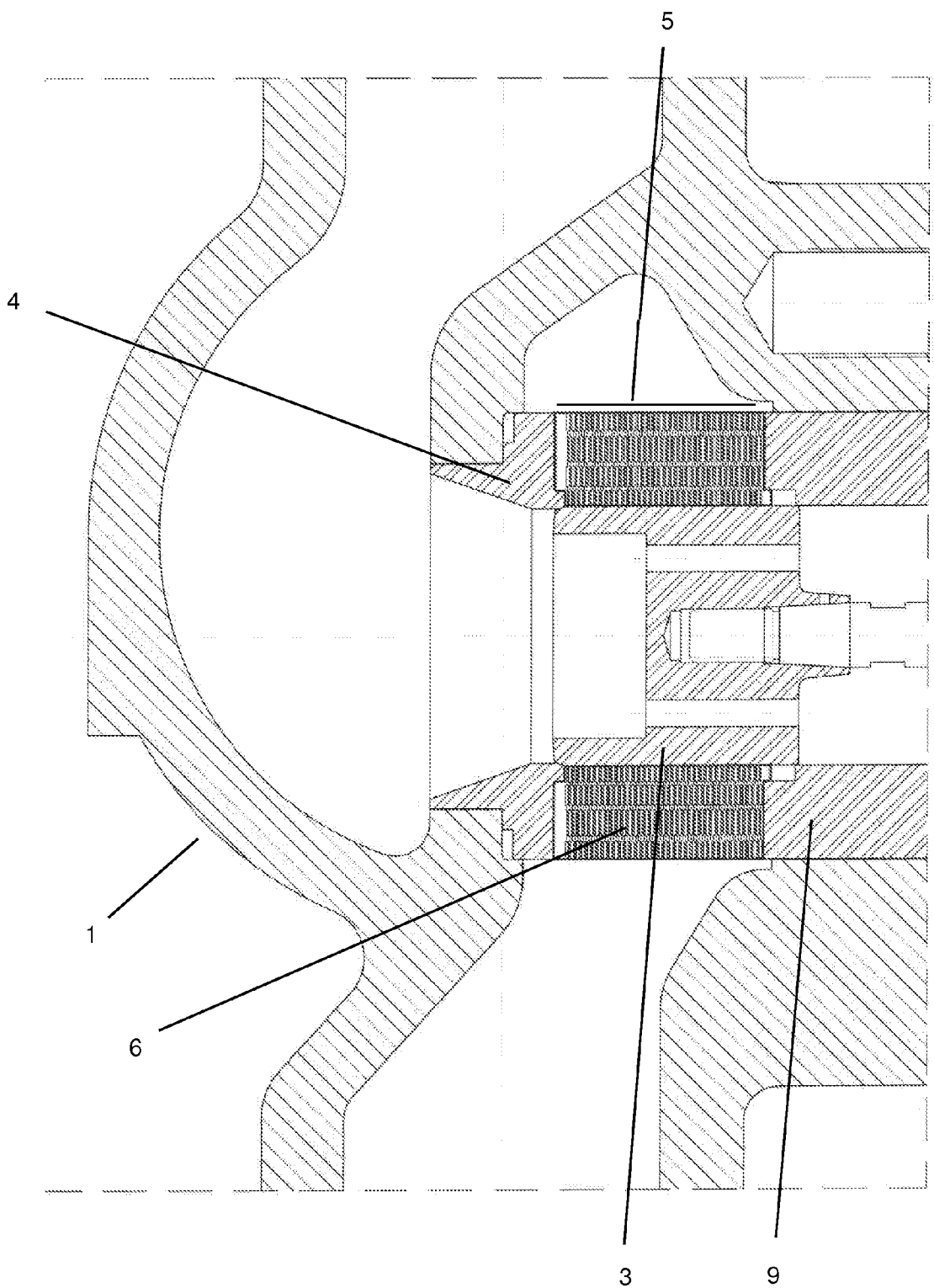
FIG. 1 shows a cross-sectional view of a preferred embodiment of the valve of the invention.
Figure 2:
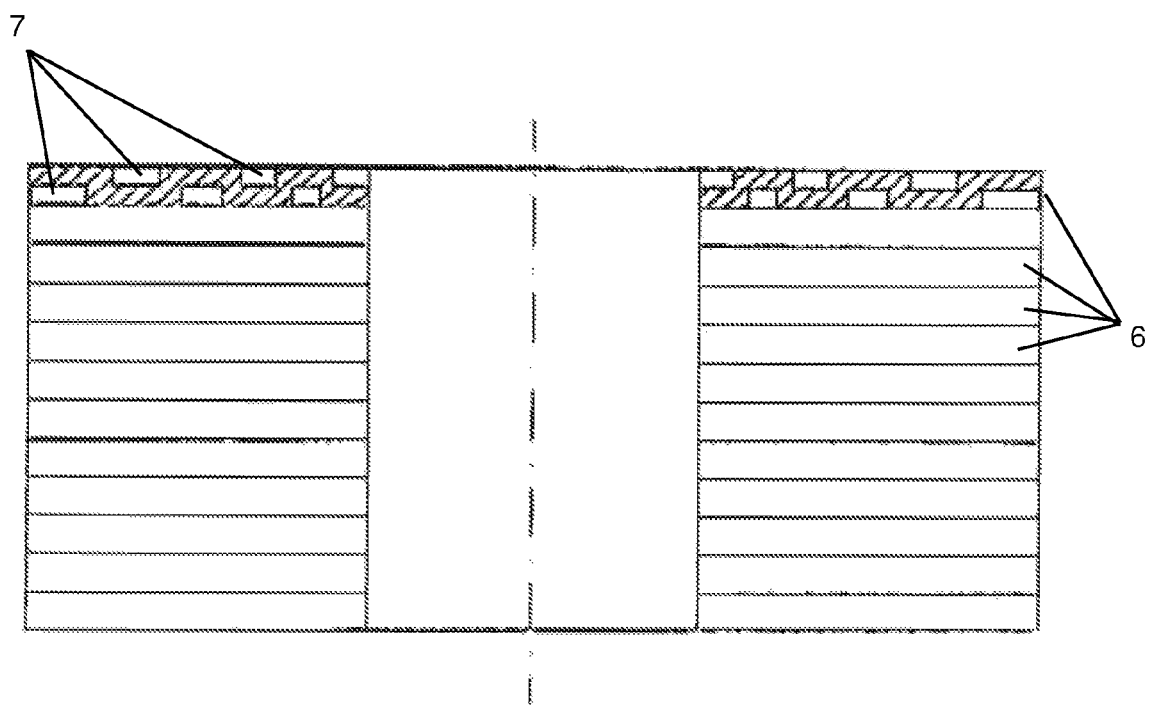
FIG. 2 shows an enlarged cross-section of one of the disks arranged on the stack of disks that form the box.
Figure 3:
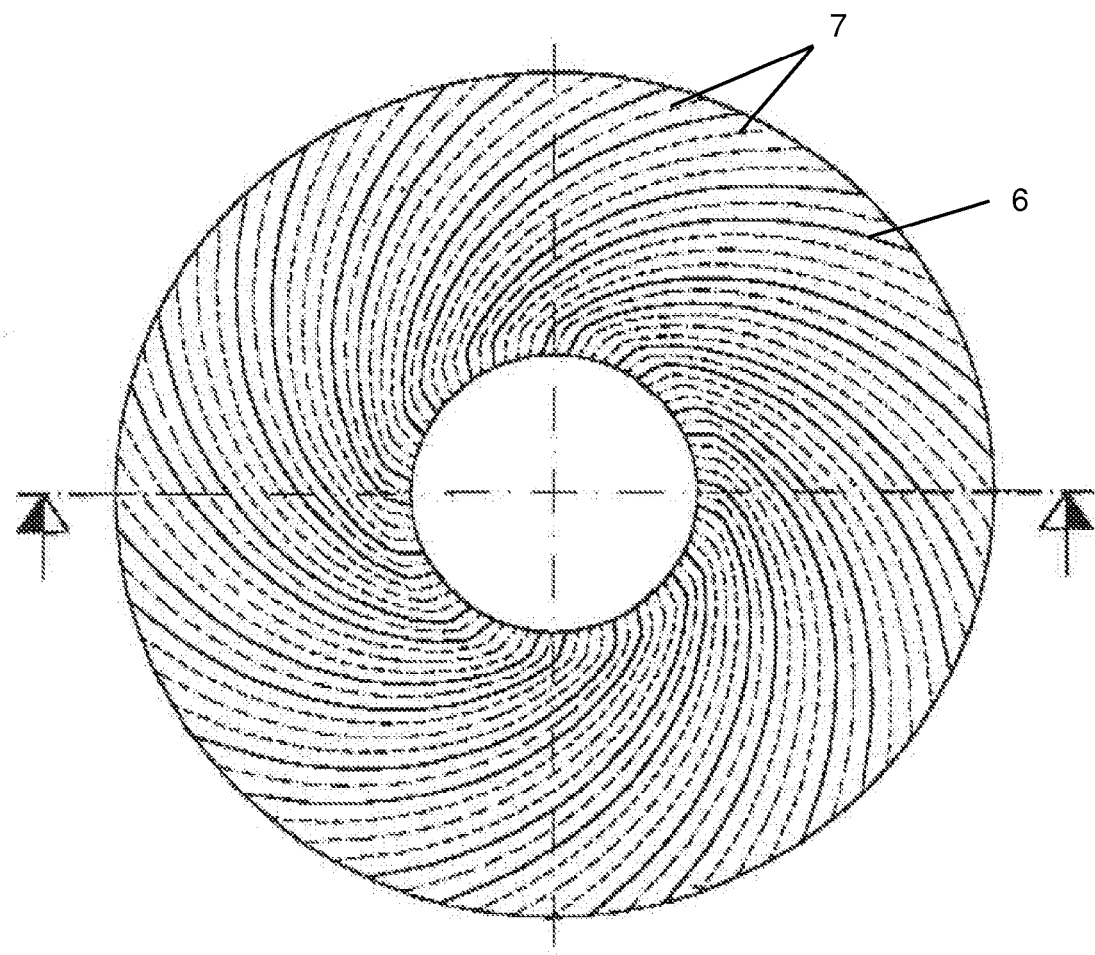
FIG. 3 shows a plan view of one of the disks showing the grooves on the front face and the grooves of the rear face are shown using intermittent lines.
Figure 4:
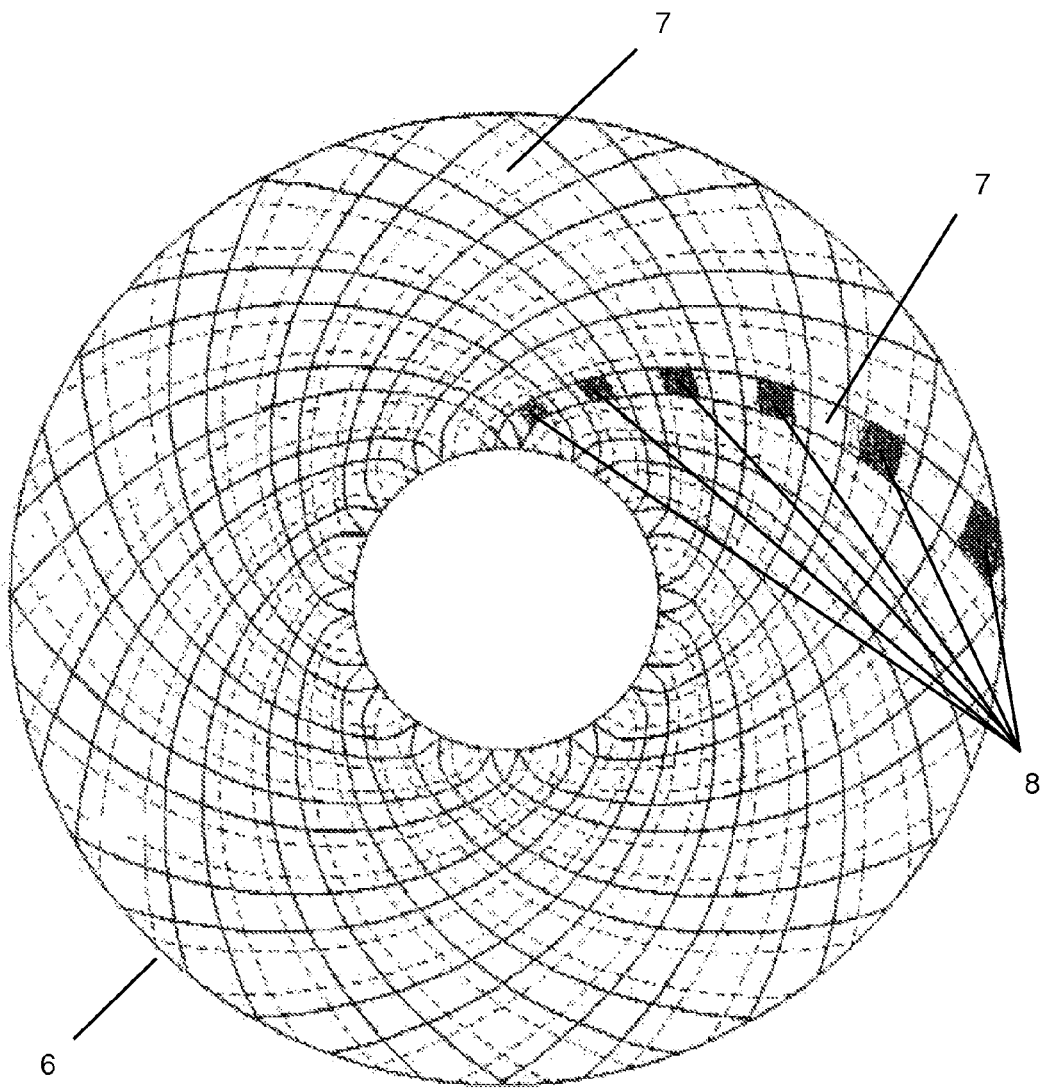
FIG. 4 shows a plan view of the intermediate chambers formed by interference of the grooves on two contiguous disks.

In view of the mentioned figures and in accordance with the numbering adopted, a preferred although non-limiting embodiment of the invention can be seen therein, that consists of a valve body (1) with a lid, a disk holder and a cylindrical plug (3) that can be moved vertically inside a box (5) and a separator (9), arranged on a lower annular block seat (4). Said box (5) is formed by an overlapping stack of disks (6). Each disk (6) has a central orifice the same diameter as the plug (3) and a number of grooves (7) in a spiral from the inner orifice to the outer contour on its upper and lower faces, wherein the grooves (7) of one face of the disk (6) are arranged in the space corresponding to the spacing between two grooves (7) on the opposite face of the same disk (6). Disks (6) stacked in the box (5) are arranged alternately, each two adjoining discs (6) having their grooves (7) arranged crossways in a counterclockwise and clockwise direction, forming a number of chambers (8) or rhombic-shaped cells between both disks (6) in the matching positions of the grooves (7) of both disks (6).

What is claimed is:

1. A fluid control valve for high pressure surges, of the type comprising:

a valve body with a lid a disk holder and a plug that can be gradually moved axially inside a setting box for equalizing and regulating the pressure surge, having a block seat on the bottom of the box, as an end position of the plug, wherein the box comprises a stack of disks spirally grooved from the inside out, forming a number of fluid passageways in said grooves;

wherein the existing grooves present on both faces of each of the disks are spiral-shaped, curving clockwise and counterclockwise, being arranged crossways to the grooves of the side facing the adjacent disk, both counterclockwise and clockwise; and in that between the crossed grooves of two side-by-side faces of two adjacent discs, a plurality of chambers or cells distributed in concentric annular spaces, operationally suitable for the fluid veins circulating through each groove collide with the concurrent fluid vein of the conjugated groove are formed, thereby producing a loss of kinetic energy of both fluid veins by creating turbulence and heat dissipation in said chamber or cell.

2. The fluid control valve pressure for high pressure surges as claimed in claim 1, wherein each disk has matching curved grooves on both sides, clockwise or counterclockwise, the grooves of one side being arranged in the intermediate space of the grooves on the opposite side, and the center orifice of the plug housing communicating with the outer contour of the discharge of the box;

wherein the grooves are formed in a spiral in a particular rotation angle and in a specific number, operationally suitable for forming with the adjacent disk grooves of a sufficient number of annular spaces of setting chambers for equalizing the flow in tiers.

\* \* \* \* \*